Figure 1:
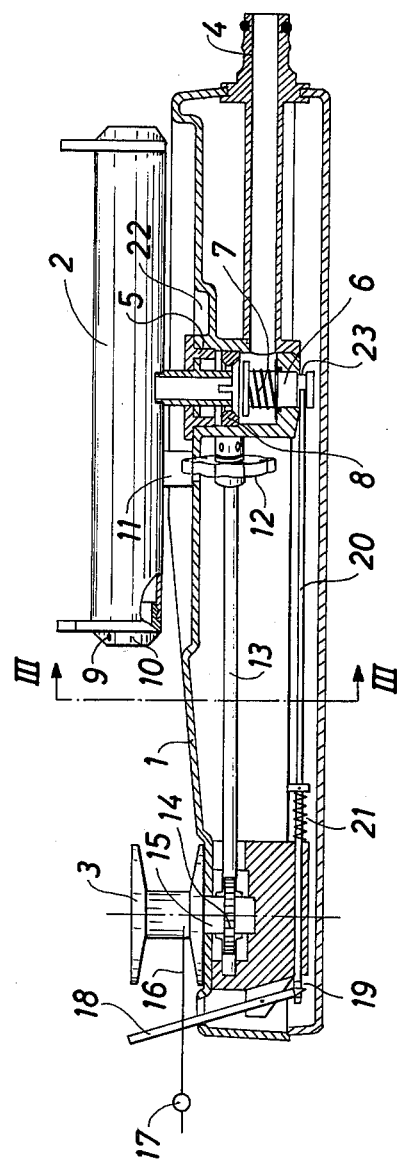

United States Patent [19]

Stenild

[11] 4,201,343
[45] May 6, 1980

[54] SELF-PROPELLED IRRIGATION SYSTEM

[76] Inventor: Eddie Stenild, Maglebo 11,, 2770 Kastrup, Denmark

[21] Appl. No.: 922,760

[22] Filed: Jul. 7, 1978

[30] Foreign Application Priority Data

Sep. 2, 1977 [GB] United Kingdom ............... 36675/77
May 30, 1978 [GB] United Kingdom ............... 36675/77

[51] Int. Cl.² .............................................. B05B 3/06
[52] U.S. Cl. ..................................... 239/189; 239/192
[58] Field of Search ........................... 239/188-192, 239/195-199; 242/86, 86.2; 137/344, 355.19

[56] References Cited

U.S. PATENT DOCUMENTS

| 693,421 | 2/1902 | Munch | 239/188 X |
| 2,883,116 | 4/1959 | Muench | 239/191 |

FOREIGN PATENT DOCUMENTS 377418 7/1932 United Kingdom ..................... 239/189

Primary Examiner—Robert B. Reeves
Assistant Examiner—Andres Kashnikow
Attorney, Agent, or Firm—Fitch, Even & Tabin

[57] ABSTRACT

A self-propelled irrigator having a water-driven rotor carrying spray nozzles and a reel driven by the rotor for winding up a rope for moving the irrigator over the ground. The reel is driven by a transmission including a ratchet wheel, the teeth of which are successively hit by an impact member on the rotor.

4 Claims, 3 Drawing Figures

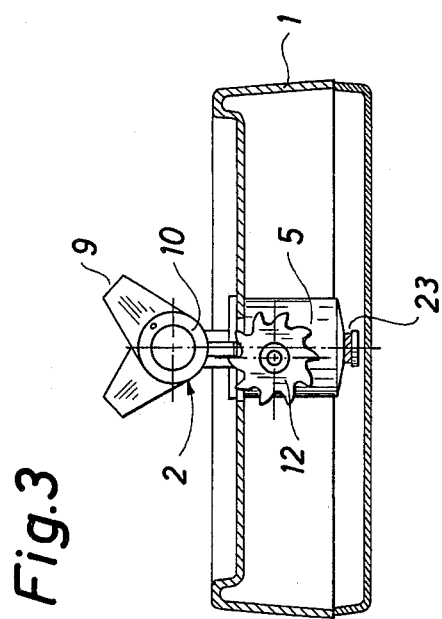

SELF-PROPELLED IRRIGATION SYSTEM

The present invention relates to a self-propelled irrigation system comprising an irrigator having an inlet adapted to be connected to a water hose, a water driven rotor rotatable about a vertical axis and having spray nozzles in communication with the inlet by means of a pipe system, and a reel driven by the rotor for winding up a rope, the end of which being securable to a fixed point in the area to be irrigated.

The object of the invention is to produce an inexpensive irrigator for use in gardens which has great power of propulsion and is easy to operate. Furthermore it is the aim of the invention that the irrigator should be designed so that its speed across the ground and the width of its work area transverse to the direction of motion are easy to regulate.

The self-propelled irrigation system according to the invention is characterized in that a ratchet wheel is adapted to drive the reel by means of a power transmission, the rope being wound up on said reel, and in that an impact member on the rotor or on a part connected therewith is arranged so as to successively hit against a tooth of the ratchet wheel during the rotation of the rotor and so as to rotate said wheel an angle corresponding to the tooth pitch by transmitting some of the rotatory energy accumulated by the rotor.

The rotor functions as an energy-accumulating flywheel, and every time the stop member hits a tooth on the ratchet wheel, some of the accumulated rotatory energy is supplied to the power transmission, which drives the reel upon which the rope is wound. Since the free end of the rope is secured to a fixed point, the irrigator is with great force pulled smoothly forward, thereby ensuring uniform irrigation.

The irrigator can easily be made of plastic, for instance, with a closed wedged-shaped cabinet, on the top of which the rotor and the reel are mounted.

In a preferred embodiment the rotor is a horizontal tube rotatably mounted at its centre and driven by the reactive forces from water jets discharged through spray nozzles located adjacent the ends of said tube, and according to the invention, a downward projecting lug may be located on the tube at a distance from the axis of rotation, said lug cooperating with a ratchet wheel fixed upon a connecting shaft, which through a worm gear drives a vertical shaft carrying the reel. Such an irrigator is inexpensive to make and is lightweight. According to the invention the spray nozzles may be pivotable about the tube axis, the speed and the pulling power being thereby easy to regulate. With the same amount of flowing water per hour, the velocity of motion will be less and the work area of the irrigator will be larger, the steeper the direction of the discharged water jets is. If the spray nozzles are turned so that the water jets become more or less horizontal, the velocity and the pulling power of the irrigator will increase, but the work area will decrease.

The irrigation system according to the invention may have coupling means which are actuated by a stop member adjacent the end of the rope that is secured in the ground in such a way that a valve in the water feed pipe to the rotor closes when the rope is almost completely wound up on the reel.

In order to facilitate the unwinding of the rope from the reel when the apparatus is to be used or in order to wind the rope easily when the apparatus is not to be used, the reel may according to the invention be detachably mounted on its drive shaft, or there may be a coupling adapted to connect and disconnect the drive transmission between the reel and the drive shaft.

Figure 2:
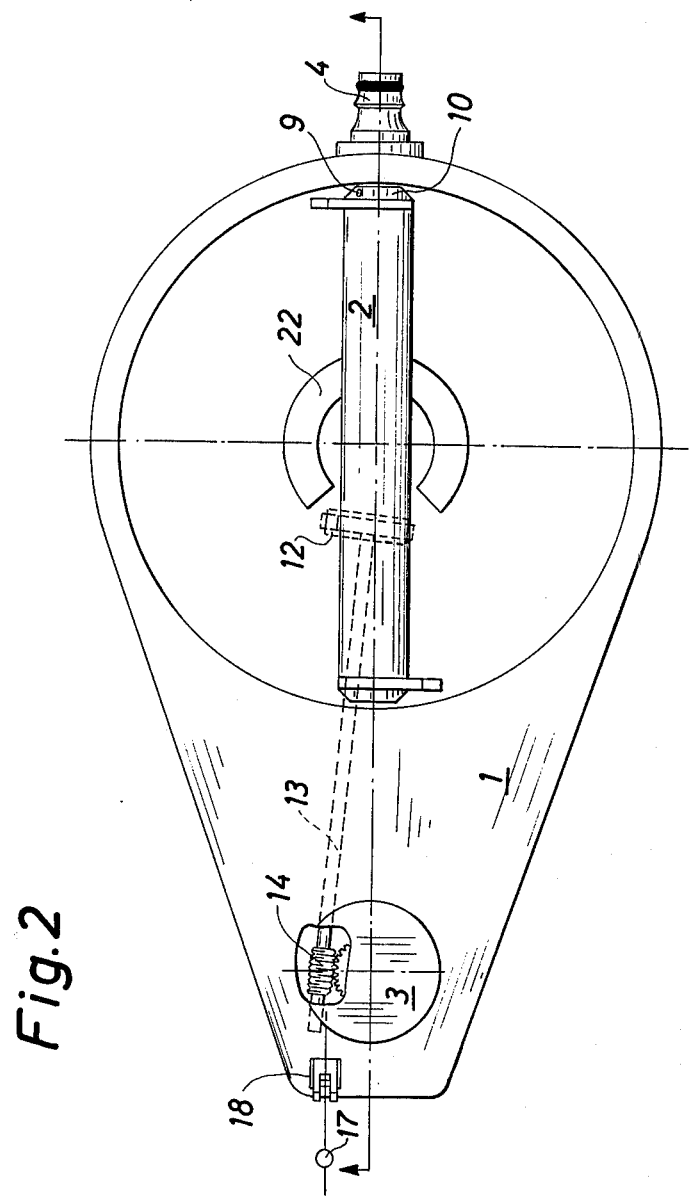

The invention will be described below with reference to the accompanying drawings, in which FIG. 1 is a side elevational view of an embodiment of the irrigation system according to the invention, partly in section, FIG. 2 is a plan view of the apparatus in FIG. 1 and FIG. 3 is the ratchet wheel and other parts of the apparatus seen along the line III—III in FIG. 1.

In the embodiment shown in the drawing the irrigation system according to the invention is an irrigator with a wedge-shaped cabinet 1, on the tope of which there is a rotor 2 and a rotatably mounted reel 3. The cabinet 1 has an inlet 4 to be connected to a water hose and is joined to a bearing housing 5, in which the rotor is rotatably mounted, so that the water can flow up through the rotor past a valve body 6 which is usually held open, but which when discharged will close against a valve seat 8 by the action of a spring 7, so that the water flow is interrupted. At each end of the rotor 2 there is a spray nozzle 9 located in an end piece 10 which is pivotable about the longitudinal axis of the rotor.

On the underside of the rotor 2 there is a downward projecting lug 11, which, when the rotor is turned by the reactive forces from the water jets discharged through the spray nozzle 9, hits a tooth on a ratchet wheel once during each rotation and consequently by utilizing the accumulated rotatory energy turns the wheel one circular pitch forward. The ratchet wheel 12 is secured upon a connecting shaft 13, which through a worm gear 14 works a drive shaft 15 which winds the reel 3.

A rope 16 is secured by a spike (not shown) or the like into the lawn that is to be watered, so that it is wound up on the reel 3 when said reel rotates, thereby pulling the irrigator across the lawn. When the irrigator has been drawn close to where the rope is securec into the lawn, a stop member, which in the embodiment shown has the form of a ball 17, hits a bifurcated rocker lever 18 whose downward projecting end meshes with a bore 19 in a draw bar 20. Said draw bar 20 is in normal position held by a retracting spring 21 in mesh with a neck portion 23 on the valve body 6, which when actuated by the spring 7 shuts off the water flow to the rotor 2. When the irrigator is to be used again, the water flow is started by pressing down the rotor 2 until the draw bar 20 again meshes with the valve body 6. This temporary pressing of the rotor 2 is made possible by a recessed circular groove 22 in the upper surface of the cabinet 1 in which the lug 11 can move.

It should be noted that the invention is not limited to the embodiment shown and described, but that the accumulation of energy during the free rotation of the rotor and the supplying of energy by the force of impact may be brought about in other ways; for instance the stop member may possibly be mounted another place in the power transmission between the rotor and the reel. The rotor may also be provided with an impeller or a worm driven by the water.

The invention has made it possible to transfer great pulling power to the rope. This may be done by letting the rotor accumulate energy during 90% of each rotation and thereafter supply energy during the remaining 10% of the rotation.

I claim:

1. A self-propelled irrigation system including an irrigator having an inlet adapted to be connected to a water hose, a water-driven rotor rotatable about a vertical axis and having spray nozzles in communication with the inlet by means of a pipe system, and a reel driven by the rotor for winding up a rope, the free end of the rope being securable to a fixed point in the area to be irrigated, the improvement comprising: a ratchet wheel mounted to directly drive the reel through a power transmission means that includes a horizontal drive shaft on one end of which is mounted said ratchet wheel and on the other end of which is mounted a worm gear, said reel being mounted on a vertical shaft that meshes with and is driven by said worm gear, said rotor being a horizontal tube rotatably mounted at its centre and driven by the reactive forces when water is discharged in jet streams through spray nozzles located adjacent the ends of said tube; and an impact member in the form of a downward projecting lug located on said tube and spaced from the axis of rotation, said impact member located so as to successively strike a tooth of said ratchet wheel during the rotation of said rotor so as to rotate said ratchet wheel and said drive shaft by an angle corresponding to the tooth pitch by the action of said rotor transmitting thereto at least part of the energy accumulated during rotation.

2. A self-propelled irrigation system as claimed in claim 1 further comprising a stop member located on the rope adjacent its free end, said member being adapted to cooperate with coupling means on the irrigator so as to interrupt the water flow to the rotor, wherein the coupling means comprises a rocker lever, one arm of which being adapted to be hit by said stop member and the other arm being in mesh with one end of a spring-actuated draw bar, the opposite end of which normally being in mesh with a stop valve body in the water feed pipe to the rotor and retaining the valve body in an open position by the action of a spring, said rocker lever when hit by the stop member on the rope being adapted to pull the draw bar into a position in which it disengages from the valve body, said body being led by spring actuation into closed position.

3. A self-propelled irrigation system as claimed in claim 1 wherein the reel is detachably mounted on its drive shaft.

4. A self-propelled irrigation system as claimed in claim 1 further comprising a coupling means adapted to connect and disconnect the drive transmission between the reel and the drive shaft.

* * * * *